United States Patent [19]

Bonniau et al.

[11] Patent Number: 5,479,828
[45] Date of Patent: Jan. 2, 1996

[54] STRUCTURE WITH INTRINSIC DAMAGE CONTROL, MANUFACTURING PROCESSES AND METHOD OF USE

[75] Inventors: Philippe Bonniau, Houilles; Bernard Estang, Chevreuse; Bernard Perrier, Viry Chatillon; Jean Chazelas, Paris; Jerôme Lecuellet, Chatenay Malabry, all of France

[73] Assignee: Thomson-CSF, Puteaux, France

[21] Appl. No.: 183,349

[22] Filed: Jan. 18, 1994

Related U.S. Application Data

[62] Division of Ser. No. 989,568, Dec. 11, 1992, Pat. No. 5,309,533.

[30] Foreign Application Priority Data

Dec. 11, 1991 [FR] France .................... 91 15347

[51] Int. Cl.$^6$ .............. G01L 1/24; G01B 11/16
[52] U.S. Cl. .................... 73/800; 156/166; 156/294; 156/296
[58] Field of Search ............... 156/166, 296, 156/294, 293; 385/12, 13; 73/800; 250/277.14, 277.15, 277.16, 277.17

[56] References Cited

U.S. PATENT DOCUMENTS

| | | | |
|---|---|---|---|
| 3,910,105 | 10/1975 | Hoffstedt | 73/800 |
| 4,581,527 | 4/1986 | Crane et al. | 385/13 X |
| 4,654,520 | 3/1987 | Griffiths | 385/13 X |
| 4,701,614 | 10/1987 | Jaeger et al. | 385/13 X |
| 4,750,796 | 6/1988 | Shibata et al. | 385/13 |
| 4,836,030 | 6/1989 | Martin | 73/800 |
| 4,888,076 | 12/1989 | Martin | 156/293 X |
| 4,936,649 | 6/1990 | Lymer et al. | 385/13 |
| 4,957,576 | 9/1990 | Fischer et al. | 156/296 |
| 5,064,270 | 11/1991 | Turpin et al. | 250/227.17 X |
| 5,094,527 | 3/1992 | Martin | 356/32 |
| 5,167,684 | 12/1992 | Turpin et al. | 65/3.11 |

FOREIGN PATENT DOCUMENTS

| | | | |
|---|---|---|---|
| 0365062 | 4/1990 | European Pat. Off. | 73/800 |
| 3443949 | 6/1986 | Germany | 385/13 |
| 2036336 | 6/1980 | United Kingdom | 73/800 |

*Primary Examiner*—Jeff H. Aftergut
*Attorney, Agent, or Firm*—Oblon, Spivak, McClelland, Maier & Neustadt

[57] ABSTRACT

Disclosed is a structure at least partially comprising a composite material, the material being made by means of sheets of fibers embedded in a matrix, the different sheets forming plies of the material, the material comprising intrinsic means for the detection and localization of a mechanical irregularity, these means comprising at least one polarization-maintaining birefrigent optical fiber having a so-called slow axis and a so-called fast axis, embedded in the matrix and describing a known path inside the material, wherein the optical fiber is included inside a casing with an internal diameter that is greater than the external diameter of the fiber.

7 Claims, 6 Drawing Sheets

STRUCTURE WITH INTRINSIC DAMAGE CONTROL, MANUFACTURING PROCESSES AND METHOD OF USE

This is a division of application Ser. No. 07/989,565, filed on Dec. 11, 1992, now U.S. Pat. No. 5,309,533.

BACKGROUND OF THE INVENTION

1. Field of the Invention

The field of the invention is that of structures integrating a composite material, the material comprising optical fibers designed to check the manufacture and the condition during use of the parts of structures made of composite material, especially multilayer materials. It relates to the composite material included in the structure, a manufacturing process and a method of measurement using the fiber for the localizing and determining of the nature of faults if any.

2. Description of the Prior Art

It is known that a composite material is constituted by fibers assembled in different sheets forming folds or plies of the material.

Depending on the mechanical stresses to which the material will be subjected, the sheets will be arranged in different directions. The composite material is thus formed by different layers or plies. Manufacturing defects may exist between two plies, despite the precautions taken during manufacture. Defects such as these, known as delamination defects, may also appear after manufacture, through ageing, as a result of deformation stresses prompted by vibrations or temperature cycles. These defects may also appear as a result of impacts. Delaminations, irrespectively of their causes, do not prompt any directly visible damage. Now this phenomenon, by creating the possibility of local buckling, considerably reduces the compression strength of the structure. Apart from this mechanical aspect, the heterogeneity thus induced in the material may modify other characteristics. Thus, if the composite material is used for the radome of an antenna, the radiation pattern of this antenna may get modified.

It is therefore necessary, during manufacture and then on a regular basis, to ascertain that the defects in the material do not exceed a threshold that has been set beforehand.

For this purpose, techniques for the non-destructive testing of mechanical structures are used. The techniques generally used are techniques of extrinsic interrogation. This is the case with thermography, acoustic emission, ultrasound and radiography.

All these techniques of checking by extrinsic means have be to applied in laboratories after the structure being checked has been removed. Apart from the disadvantage wherein the equipment has to be removed and remains out of service, the techniques used call for a lengthy learning process in order to be able to have knowledge of the nature of the defects, their dimensions and their localization from the measurement results obtained.

Given the advances made in the manufacture of intrinsic sensors with optical fibers, the use of such sensors has been envisaged through their direct inclusion within the composite material.

An inclusion such as this is reported in an article entitled Améliorer les performances des composites par fibre optique (Improving the Performance Characteristics of Composite Materials by Optic Fibers) in the journal *Electronique International Hebdo*, No. 18, 9th May 1991, page 15. This article reports that the project envisaged "consists in the embedding, in a composite material, of a continuous polarization maintaining optical fiber playing the role of an array of sensors, i.e. where the parameter to be measured acts directly on the fiber (unlike extrinsic fibers where the optical fiber is used solely as a medium for the conveying of information). Here, the optical fiber modifies the nature of the signal that travels through it as a function of the deformations and of the temperature. According to the director of the project, with a spacing of 10 cm between each measuring point, the number of points may vary from 20 to 100 depending on the length of the fiber. The primary applications in view are in the aeronautical sector. However [the firm] Bertin, which uses the principle of spectral modulation coding for the processing of measurements, intends to extend the field of application of the array of extrinsic sensors, notably to the measurement of the vibration of a structure".

The main drawback of the measuring method reported here above arises out of the number of steps which is at most equal to the quotient obtained by dividing the width of the total spectrum by the width of the smallest spectrum that it is possible to isolate. According to the method, the meshing of the composite part by the different sensors should be predetermined. It is also necessary to have the ability, through the analysis of the signal picked up at an output of the fiber, to separate the modifications due to the temperature from those due to the mechanical stresses.

The technical problem resolved by the present invention is therefore that of knowing which polarization-maintaining optical fiber is to be used, how to position it inside the composite material, how to replace it in the event of damage and make the material without damaging the optical fiber, and finally, how to make a measurement and use it in order to know the zone in which a defect, if any, might be located.

An aim of the invention, therefore, is to enable the detection and localizing of an irregularity, whether this irregularity is due to a manufacturing defect or to a shock, of a delamination, inside a part made of composite material, the detection and localizing being done by the analysis of the signal going through the fiber without any predetermining of the meshing along the fiber by the nature of the signal that is injected therein.

The aim is also to detect stresses or modifications of stresses located within a predetermined range. Finally, these detections and localizations of irregularities can be made in real time or in deferred time. Real-time analysis is especially worthwhile when the composite part is the radome of an antenna for which it is important to ensure that the radiation pattern remains constant, for example an antenna radome for an instrument landing system (ILS). In every case, the invention enables the detection of defects by means of a single instrument, for example a Michelson interferometer with movable mirror, without any need to remove the part.

SUMMARY OF THE INVENTION

To all these ends, an object of the invention is a structure at least partially comprising a composite material, the material being made by means of sheets of fibers embedded in a matrix, the different sheets forming plies of the material, the material comprising intrinsic means for the detection and localization of a mechanical irregularity, these means comprising at least one polarization-maintaining birefringent optical fiber having a slow axis and a fast axis of propagation, the fiber being embedded in the matrix and describing a known path inside the material, wherein the optical fiber is included inside a casing with an internal diameter that is greater than the external diameter of the fiber.

The inclusion of the fiber, possibly coated with an overlayer designed to modify the value of a coupling between the axes of propagation of the fiber, within a casing, makes it easier to obtain a range of values of stresses, corresponding to a linear modification, as a function of the stress, of a parameter of a luminous radiation being propagated in the fiber.

BRIEF DESCRIPTION OF THE DRAWINGS

Embodiments of composite materials including the sensor and its casing as well as curves illustrating the results obtained shall now be described with reference to the appended drawings, of which.

MORE DETAILED DESCRIPTION

The optical fiber chosen for this type of application is the fiber described in the French patent FR No. 8915872.

Figure 1:
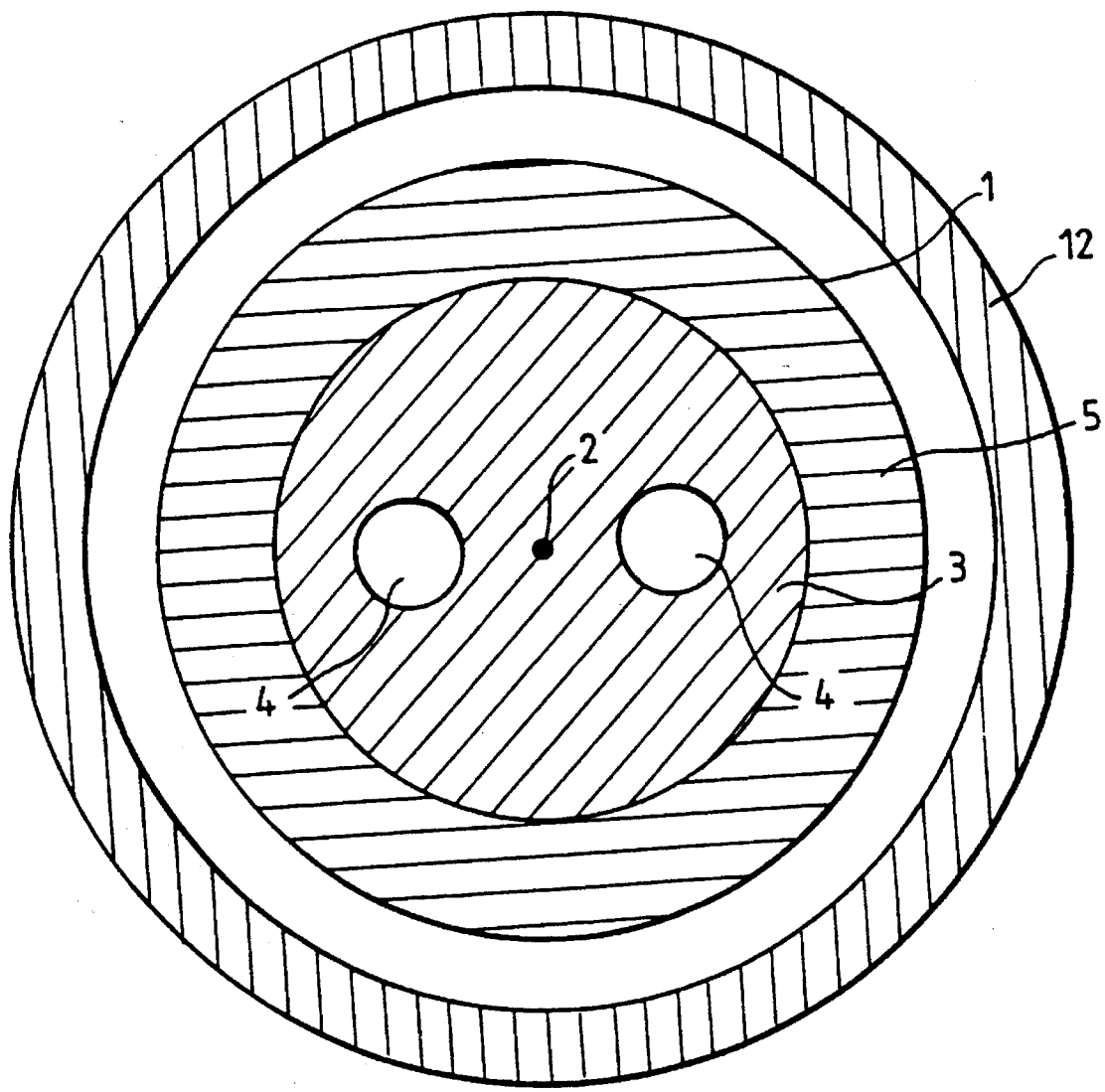
FIG. 1 shows a cross-section of a fiber used.

A cross-section of this fiber 1 is shown in FIG. 1.

This fiber has the following elements, taken from the center towards the exterior:

First of all, it has an optical core 2 having a diameter of about 6 μm. This optical core 2 is surrounded by a first sheath 3 with a diameter of about 125 μm. This sheath 3 has two diametrically opposite circular channels 4 with a diameter of 37 μm. The sheath 3 is itself located within an overlayer 5.

In one embodiment, the layer 4 is made of epoxy acrylate and the overlayer 5 is made of teflon.

The fiber is a polarization-maintaining birefringent fiber. It has the particular feature of being very sensitive to pressure and of having little sensitivity to temperature. The fiber is inserted in a teflon casing 12, the internal diameter of which is greater than the external diameter of the overlayer 5.

Figure 2:
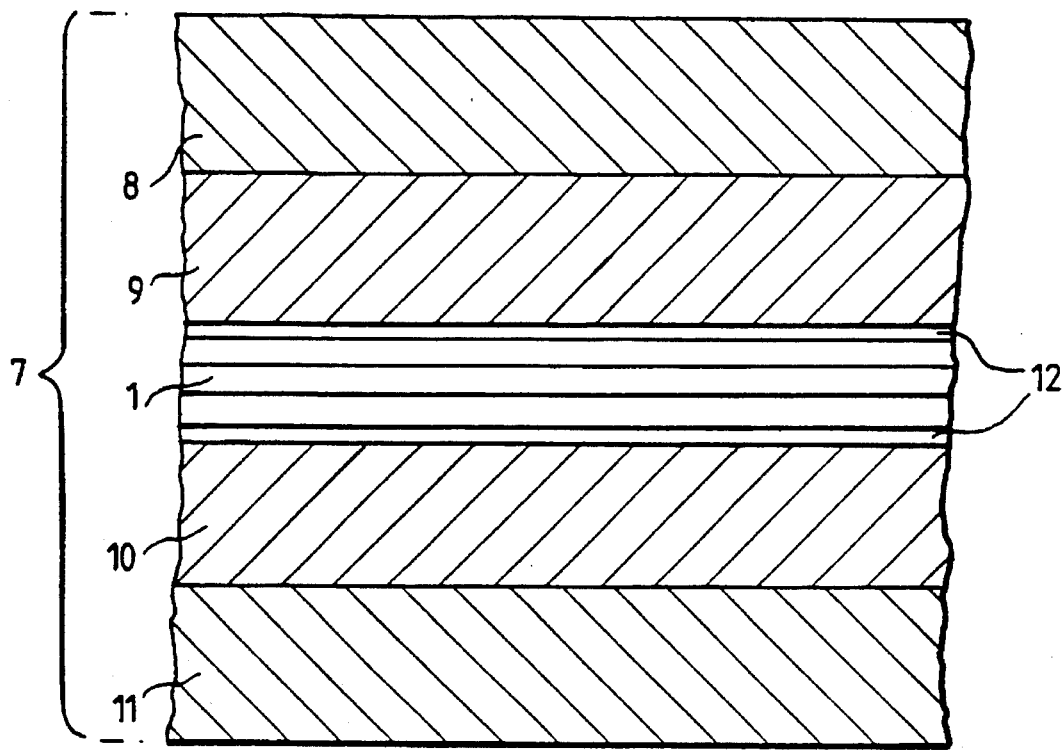
FIG. 2 shows a cross-section of a composite material including a fiber according to the invention, the fiber being shown in longitudinal section.
Figure 3:
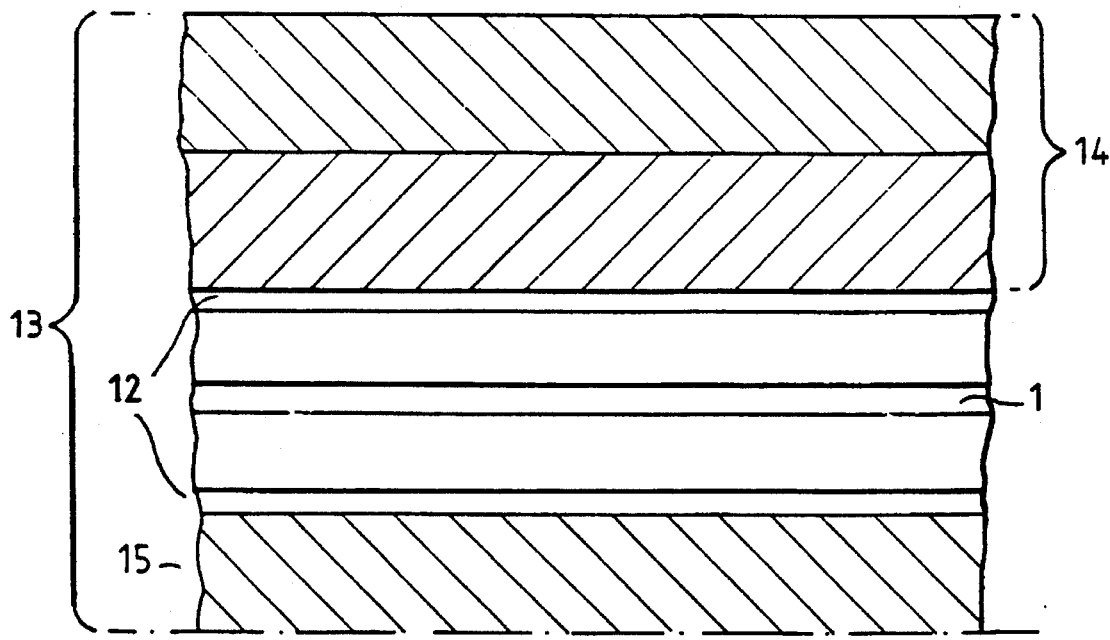
FIG. 3 shows a half cross-section of a sandwich composite material including a fiber according to the invention, the fiber being shown in a longitudinal section.

Two modes of insertion are shown in FIGS. 2 and 3.

FIG. 2 shows a cross-section of a part of composite material 7 comprising four plies referenced 8 to 11. The fiber 1 is inserted between the central plies 9 and 10 inside a casing FIG. 3 shows a half-section of a sandwich material 13, an external layer 14 of which is a composite material. The material 13 comprises a core 15 which may be, for example, made of a hardened foam or a material with a honeycomb structure. The casing 12, in which the fiber 1 is inserted, is housed between the core 15 and the composite material 14.

There are other possible modes of implanting the fiber 1 that do not contravene the teachings of the present invention.

Figure 4A:
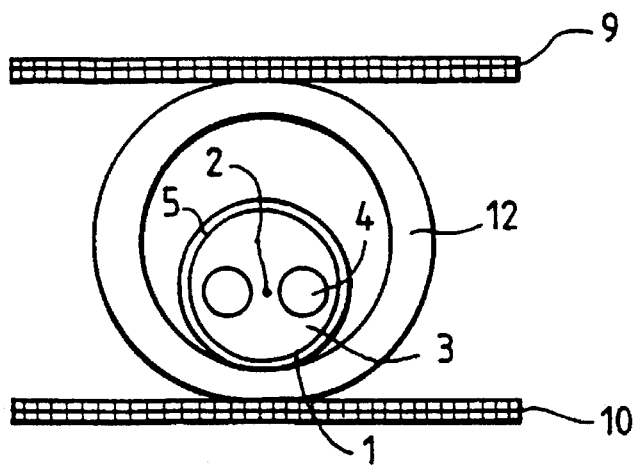
FIGS. 4a, 4b, 4c show a cross-section of a composite material including a fiber according to the invention, the fiber being placed under variable stresses.
Figure 4B:
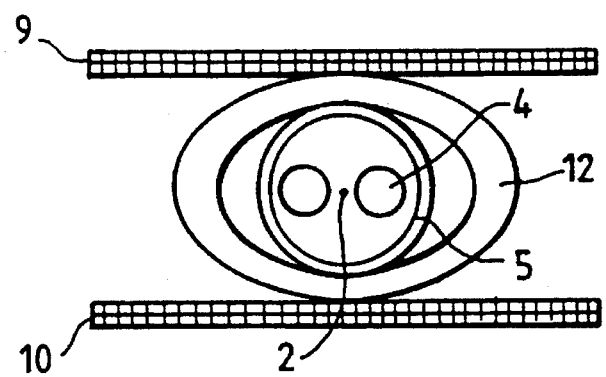
Figure 4C:
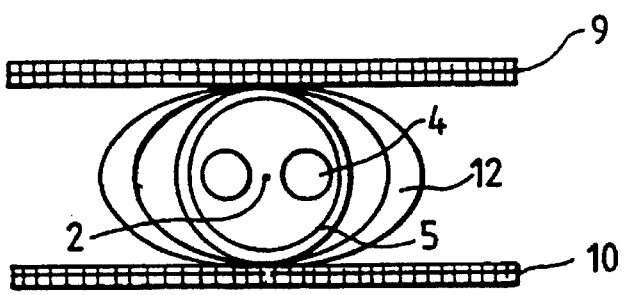

The choice of the nature of the material constituting the casing 12 and its diameter will depend on the nature of the deformations that are to be recorded. Explanations on this subject shall be given here below with reference to FIGS. 4a to 4c and to the curve 5. FIGS. 4a to 4c show a cross-section of the fiber 1 and its casing 12 between two layers 9, 10 of composite material.

In FIG. 4a, the material is subjected to a compressive stress which slightly deforms it.

In FIG. 4b, the casing 12 is sufficiently deformed for the fiber 1 to be compressed between two thicknesses of the casing. In FIG. 4c, the casing 12 is flattened to its maximum and no longer plays any stress-absorbing role.

Figure 5:
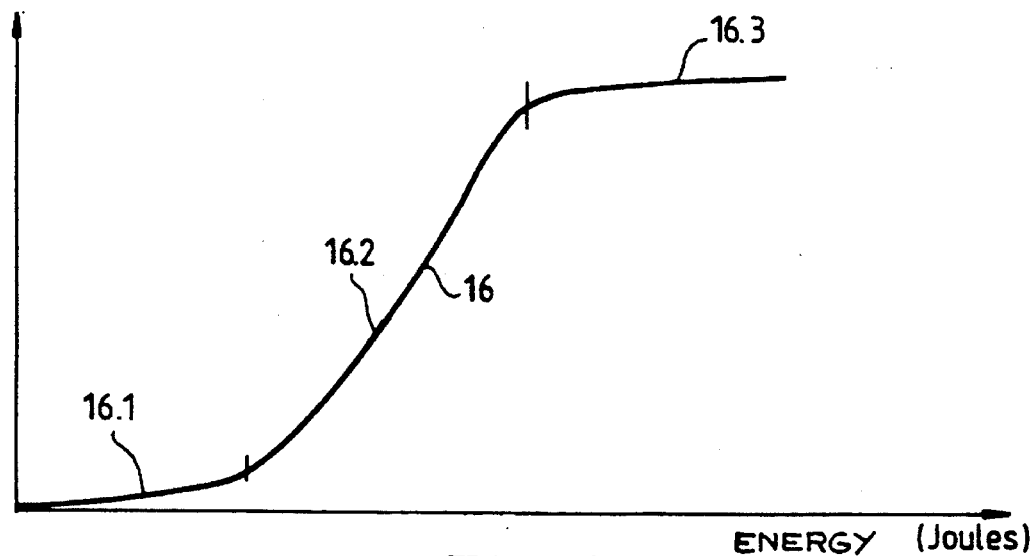
FIG. 5 is a curve showing the variation of the intensity of an optical signal as a function of the stress undergone locally by the fiber.

The curve 16 of FIG. 5, which shows the optical response of the fiber thus subjected locally to these stresses, has three parts.

This curve 16 shows the variations of the levels of an optical signal as a function of the deformation of the casing 12. The level is given in terms of percentage of a main peak of this signal. The nature of this signal, and the way to obtain it, shall be given further below. The deformations are represented by the energy in Joules needed to obtain them. The three zones are analyzed as follows:

In a part 16-1 which corresponds to the range of energies that create deformations, undergone by this casing 12, between the shape of FIG. 4a and the shape of FIG. 4b, the response is low.

In the part 16-2 which corresponds to the range of energy where there is a passage from FIG. 4b to FIG. 4c, the response is linear and a calibration on a sample enables high reproducibility. It is this part of the curve that is used to detect the damage. It is therefore by choosing a material with an appropriate Young's modulus to make the casing that it will be possible to choose the range of stresses for which measurements are to be made. Furthermore, for a same material and a same thickness of the casing 12, the sensitivity obtained is greater when the diameter of the casing 12 diminishes. This means that the slope of the rectilinear part 16-2 is greater and more to the left. The part 16-3 corresponds to a saturation threshold.

If the measurement is made in deferred time, it is preferable for the material of the casing to be inelastic in the chosen range of stresses.

The measurement then corresponds to the greatest stress. If the measurement is made permanently in real time, it is preferable for the material of the casing to be elastic in the chosen range of stresses. The latter case is particularly well suited to the example of a radome.

The principle of the measurement shall now be explained with reference to FIGS. 6 and 7.

Figure 6:
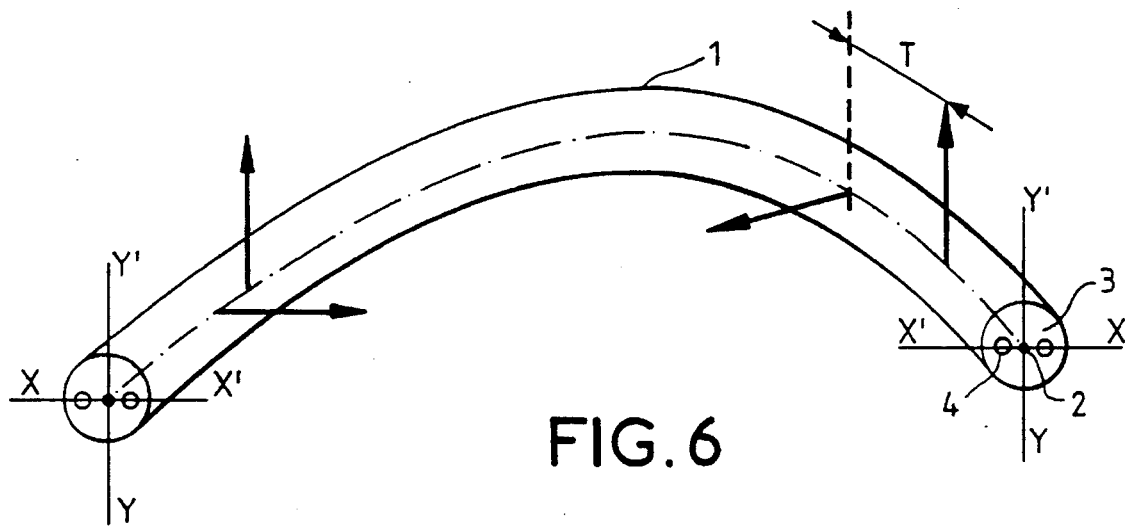
FIG. 6 is a diagram designed to illustrate the working of the polarization-maintaining fiber.
Figure 7:
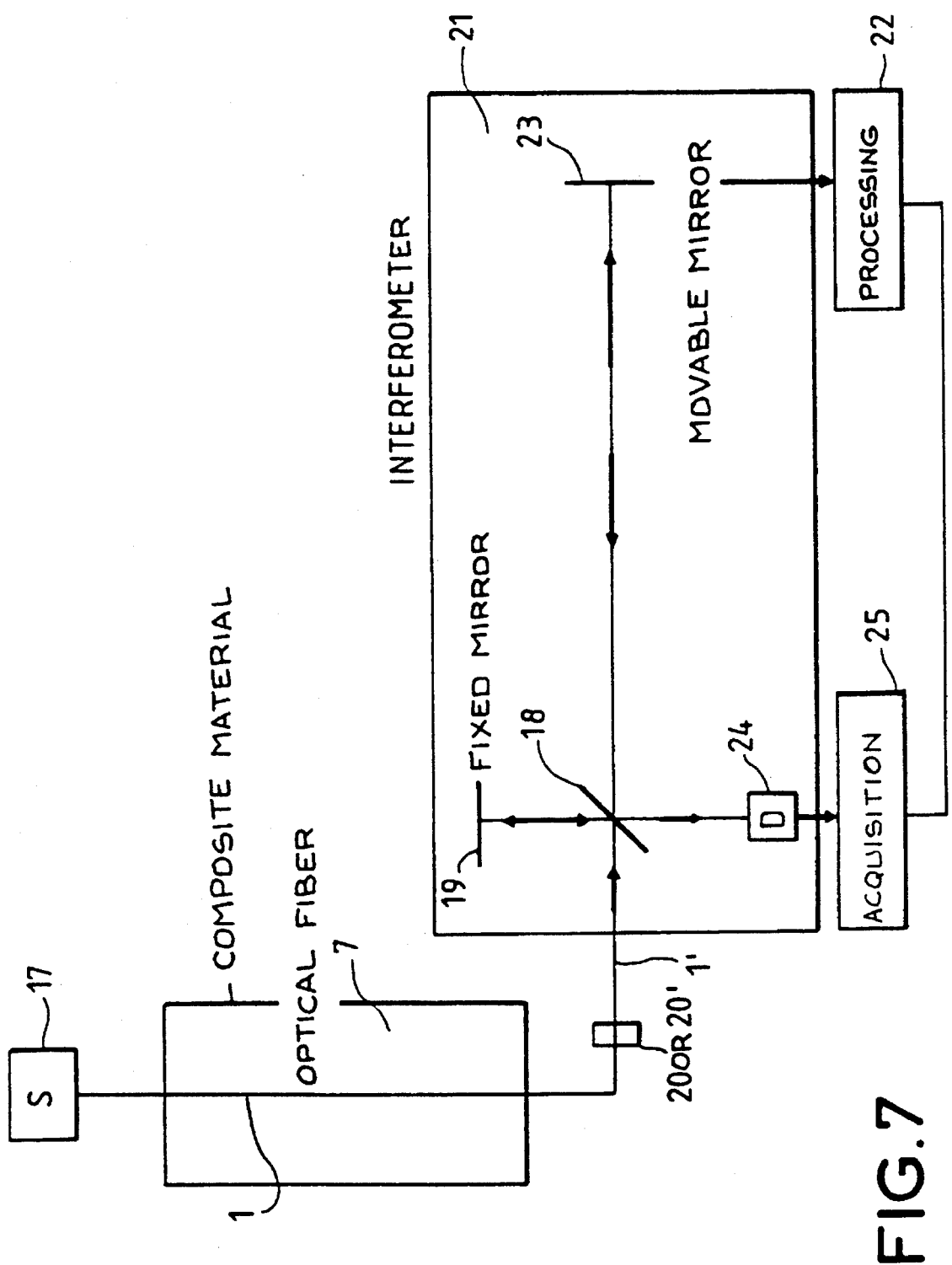
FIG. 7 is a diagram illustrating the principle of the measurement.

FIG. 6 shows a view in perspective of a birefringent fiber used in the measuring device according to the invention. In this fiber, the light is propagated in two orthogonal directions referenced XX' and YY' to which there correspond longitudinal propagation constants βx and βy $$\beta x = \frac{2\pi}{\lambda} n_x \text{ and } \beta y = \frac{2\pi}{\lambda} n_y$$

$\lambda$ is the wavelength of the light wave and $n_x$ and $n_y$ are the respective indices in the two directions. If $n_x$ and $n_y$ are different, the two waves get propagated at different speeds. If the fiber has a length L, the total phase shift between the two waves is:

θ=(βx−βy) L or with βx−βy=β

θ=βL

In FIG. 6, the vectors represent the directions of the propagation modes. The axis XX' is the axis that joins the centers of the channels 4. The axis YY' is perpendicular to it. T is the delay between the two waves.

If a single mode of propagation is excited at the starting point of a light source applied to the fiber, and if there are no disturbances, the light reaches the other end of the fiber in this mode alone. A point of stress on the fiber creates a coupling between the two propagation modes. If the YY' mode is excited at the outset, it means that from this coupling point onwards, a fraction of the light energy will get propagated also in the XX' mode. The value of this fraction is a function of the value of the stress. It is the value of this fraction that is shown in the curve of FIG. 5. Starting from the coupling point, a light wave will get propagated at a lower speed (if the axis XX' is the slow axis) than the wave propagated on the axis YY'.

The lag between the two waves is all the greater as the distance between the coupling point created by the stress and the point of measurement of the lag is great.

The principle of the measurement thus makes it possible to know the intensity of the stress and its localization.

In the embodiment according to the invention, the measurement is made in the manner described with reference to FIG. 7.

The light coming from a source S 17 is introduced into the measurement fiber 1. It is a continuous light wave with high spatial coherence and low temporal coherence. The fiber 1 goes through the composite material 7 in a path that provides for a meshing of the material which is a function of the minimum surface area of the delaminations that are to be observed. The light coming from the fiber 1 is sent by means of a polarizer 20 and a semi-reflective plate 18 towards the two mirrors of a Michelson interferometer 21, a fixed mirror 19 and a movable mirror 23. The polarizer is a polarizer by 45° with respect to the axis of the fibers. It will be noted that the polarizer and the interferometer can be replaced by any means by which it is possible to make interferences, between a reference wave train, herein the wave train permanently on the fast axis, and a wave train that is delayed with respect to this reference train. It is therefore appropriate to bring the wave trains back to a single polarization. Another embodiment consists in replacing the polarizer 20 with a fiber junction 20', the slow and fast axes of which are intersected at 45°. The fiber 1 at an output of the polarizer or the junction is preferably long. The shifting of the movable mirror 23 makes it possible to identify all the phase-shifts for which the reference wave, the wave that has remained continuously on the fast axis, interferes with waves which, at each coupling point, have begun to travel on the fast axis and arrive all the later as the coupling point is distant from the measuring point.

A processing device 22 that enables the shifting of the movable mirror 23 of the interferometer and a detection device 24 associated with an acquisition system 25 are used, in a known way, to localize the coupling points and determine the intensity of the stress.

A mode of manufacture of a composite material including the fiber 1 inside its casing 12 shall now be described.

The fiber 1 the external diameter of which, taking into account the overlayer of teflon, is 550 μm, is introduced into a teflon casing 12, the external diameter of which is 1240 μm. The casing provided with its fiber is then placed between the plies 9 and 10 of the material 7.

Figure 8:
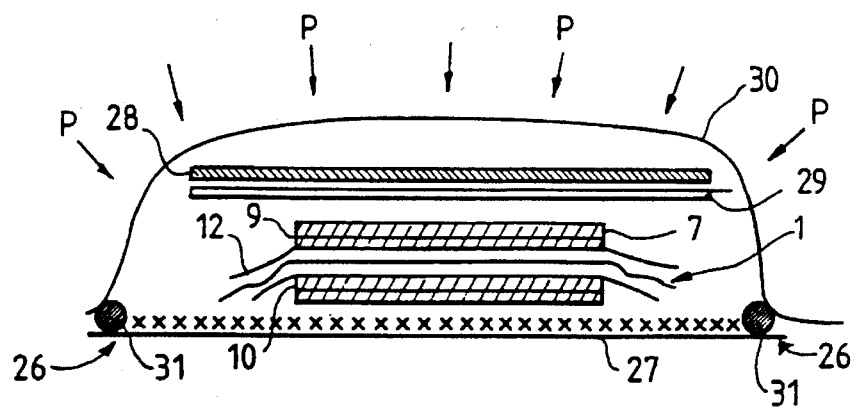
FIG. 8 illustrates a process for the manufacture of a material included in a structure according to the invention.

The compacting of the kevlar/epoxy 1454 impregnated plies is done by means of a pressure/temperature cycle in an autoclave. The device is shown schematically in FIG. 8.

The material 7, comprising its optical fiber 1 integrated into a casing 12 placed between two plies 9, 10, is positioned on a vacuum table 26, impregnated with a demolding agent 27. On top of the material 7, there is placed a piece of felt 28 designed to absorb the excess resin. A film 29 separates the piece of felt 28 from the material 7. The Set formed by the material and the piece of felt is surrounded by a vacuum bag 30 connected to the table by a sealing mastic 31.

This installation enables the creation of a vacuum in the zone included in the vacuum bag and the pressurizing of what is contained in the bag.

Figure 9:
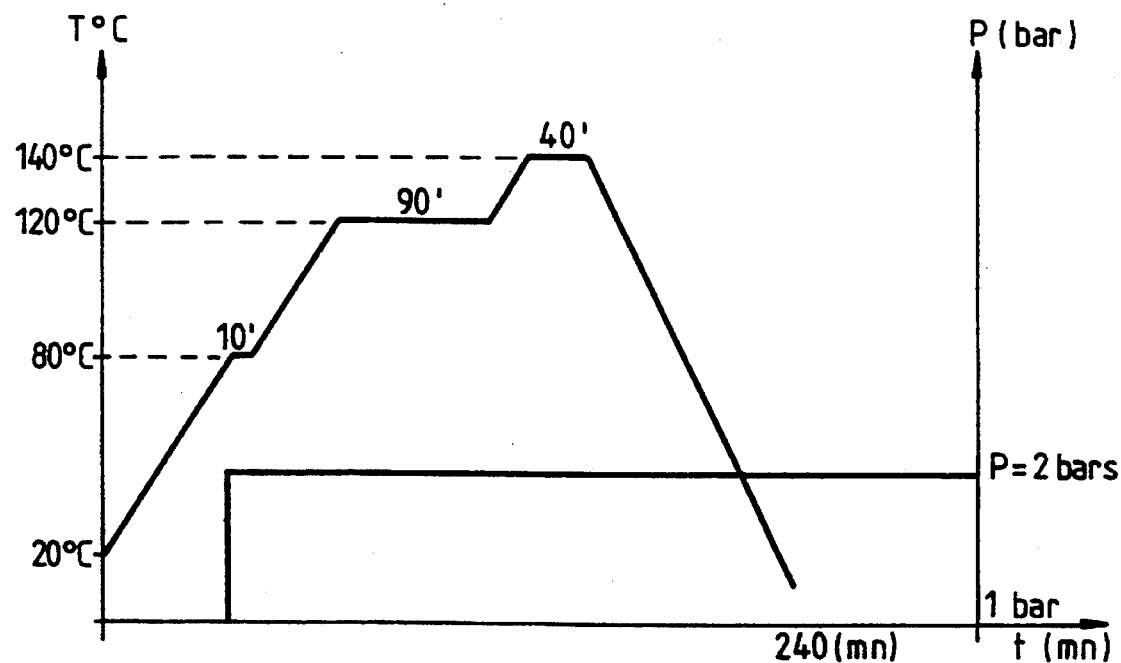
FIG. 9 is a graph of values of temperature/pressure used in a manufacturing process according to the invention.

The temperature/pressure cycle is shown in FIG. 9.

After a rise in temperature, a stable level of 80° C. is applied for ten minutes to homogenize the temperature of all the material before the polymerization stage. During the stage of the rise in temperature, a high vacuum is created in the vacuum bag. At the end of this stage, a pressure of 2 bars, namely 3 bars in view of the vacuum, is applied. The temperature is then taken to 120° C. which is the minimum temperature of polymerization of the chosen resin. This temperature is maintained for 90 minutes. The temperature is then taken to 140° C. for 40 minutes to ensure total stabilization of the resin.

What is essential during the cycle is successfully carrying out the stage of the polymerization and stabilization of the resin used to constitute the material without ever exceeding the temperature at which the fiber or one of its coatings starts to melt.

In the present case, the weakest layer of the fiber is the epoxy acrylate layer 3 which starts getting damaged at 180° C. It is therefore necessary to choose the resin as a function of the materials constituting the fiber. The resin included in the composite material should be capable of being polymerized and stabilized at a temperature below the temperature that would damage the weakest layer of the fiber.

The use of a casing enables the fiber to be protected against a risk of shearing at the inputs and outputs of the fiber of the material.

When, as in the case of the embodiment, the casing is made of teflon and the fiber is itself coated with an external layer made of teflon, it is possible to follow the same heat treatment cycle or a different heat treatment cycle, the casing being placed in the same way but the fiber being not positioned inside the casing before the heat treatment. The fiber is then slid into the material after heat treatment. With this manufacturing method, the necessary conditions of temperature described here above are no longer necessary. However, the casing and external coating of the fiber should be chosen to have a good sliding coefficient. This method of manufacture enables the fiber to be replaced swiftly in the event of damage.

What is claimed is:

1. A method for determining a value and localization of a stress comprising the steps of:

providing a structure comprising a composite material including a plurality of sheets forming piles, a casing formed between two of the plurality of sheets forming the composite material, the casing having an internal diameter, and an optical fiber located within the casing and having an external diameter which is less than the internal diameter of the casing so as to form a non-solid void area between the external diameter of the optical fiber and the internal diameter of the casing, the optical fiber having a slow axis and a fast axis of propagation;

introducing an input signal constituted by a continuous light wave with low temporal coherence and high spatial coherence into the optical fiber;

measuring a phase-shift between a wave train of the fast axis known as a reference signal and each of the successive wave trains coming from the slow axis at an output of the optical fiber.

2. A method according to claim 1 wherein, furthermore, the relative intensity between phase-shifted signals and the reference signal is measured.

3. A method of measurement according to claim 1, wherein the phase-shift is measured by means of an interferometer comprising a fixed mirror and a movable mirror.

4. A method for determining a stress in a composite material comprising the steps of:

providing a composite material comprising a plurality of sheets forming piles, a casing formed between two of the plurality of sheets forming the composite material, the casing having an internal diameter, and an optical fiber located within the casing and having an external diameter which is less than the internal diameter of the casing to thereby form a non-solid void area between the optical fiber and casing, the optical fiber having a slow axis and a fast axis of propagation;

inputting an input light signal into the optical fiber;

detecting an output signal light output from the optical fiber based on the input light signal input into the optical fiber;

measuring a phase-shift in the output light signal of first light waves along the fast axis of the optical fiber and second light waves along the slow axis of the optical fiber; and determining stress in the structure based on the measured phase-shift.

5. The method according to claim 4, wherein the phase-shift is measured in a Michelson interferometer.

6. A process for the manufacture of a structure comprising the steps of:

providing an optical fiber having a fast axis of propagation and a slow axis of propagation;

disposing the optical fiber within a casing; the optical fiber having an external diameter which is less than an internal diameter of the casing so as to form a non-solid void area between the external diameter of the optical fiber and the internal diameter of the casing;

disposing the casing with the optical fiber in a composite material including a plurality of sheets forming piles, the casing with the optical fiber being disposed between two of the sheets of the composite material to generate a resulting structure; and polymerizing and stabilizing the resulting structure by a temperature and pressure cycle, wherein a maximum temperature of the cycle remains below a temperature for which the optical fiber risks being damaged.

7. The process according to claim 6, wherein the maximum temperature of the cycle is 140° C.

* * * * *